(12) United States Patent
Wu

(10) Patent No.: US 11,785,369 B2
(45) Date of Patent: Oct. 10, 2023

(54) MULTI-DIMENSIONAL MICROPHONE STAND

(71) Applicant: AVerMedia TECHNOLOGIES, INC., New Taipei (TW)

(72) Inventor: Cheng-Yun Wu, New Taipei (TW)

(73) Assignee: AVerMedia TECHNOLOGIES, INC., New Taipei (TW)

( * ) Notice: Subject to any disclaimer, the term of this patent is extended or adjusted under 35 U.S.C. 154(b) by 55 days.

(21) Appl. No.: 17/453,344

(22) Filed: Nov. 3, 2021

(65) Prior Publication Data
US 2022/0150612 A1 May 12, 2022

(30) Foreign Application Priority Data
Nov. 6, 2020 (TW) ................................ 109138886

(51) Int. Cl.
| | | |
|---|---|---|
| *H04R 1/08* | (2006.01) | |
| *F16M 13/02* | (2006.01) | |
| *F16M 11/04* | (2006.01) | |
| *F16M 11/20* | (2006.01) | |
| *F16M 11/10* | (2006.01) | |

(52) U.S. Cl.
CPC ............ *H04R 1/08* (2013.01); *F16M 11/041* (2013.01); *F16M 11/10* (2013.01); *F16M 11/2064* (2013.01); *F16M 13/022* (2013.01); *F16M 2200/021* (2013.01)

(58) Field of Classification Search
CPC .. F16M 11/041; F16M 11/10; F16M 11/2064; F16M 13/00; F16M 13/02; F16M 13/022; F16M 2200/021; H04R 1/08
See application file for complete search history.

(56) References Cited

U.S. PATENT DOCUMENTS

| | | | | |
|---|---|---|---|---|
| 5,775,654 | A * | 7/1998 | Price ................. | A47G 23/0225 248/103 |
| 6,594,371 | B2 * | 7/2003 | Wetzel ................ | F16M 11/28 381/361 |
| 6,796,536 | B1 * | 9/2004 | Sevier, IV .......... | A47B 23/046 248/924 |
| 7,367,740 | B2 * | 5/2008 | Lazic .................. | F16M 11/12 403/103 |
| 9,133,982 | B1 * | 9/2015 | Valdez ................ | F16M 13/022 |
| 9,709,217 | B2 * | 7/2017 | Trinh .................. | F16M 11/105 |
| 9,719,627 | B2 * | 8/2017 | Hennessey ......... | F16M 11/2021 |
| 10,702,067 | B2 * | 7/2020 | Acevedo ............. | F16M 11/14 |
| 11,293,586 | B1 * | 4/2022 | Kallas ................. | H04R 1/08 |

(Continued)

*Primary Examiner* — Monica E Millner
(74) *Attorney, Agent, or Firm* — CKC & Partners Co., LLC

(57) ABSTRACT

A multi-dimensional microphone stand includes a first rotational module, a first rotational arm, a second rotational module, a second rotational arm, and a third rotational module. The first rotational arm is connected to the first rotational module, and the second rotational module is connected to the first rotational arm, and the first rotational module is rotatable relative to the second rotational module. The second rotational arm is connected to the second rotational module, the third rotational module is connected to the second rotational arm, and the second rotational module is rotatable relative to the third rotational module. In addition, in a folded state, the first rotational arm and the second rotational arm are arranged side by side and connected to the second rotational module in parallel.

9 Claims, 4 Drawing Sheets

(56) References Cited

U.S. PATENT DOCUMENTS

| | | | |
|---|---|---|---|
| 2002/0154789 A1* | 10/2002 | Rodgers | F16M 11/041 |
| | | | 381/361 |
| 2005/0006542 A1* | 1/2005 | Henning | F16M 11/2064 |
| | | | 248/274.1 |
| 2012/0020511 A1* | 1/2012 | Power | H04R 1/086 |
| | | | 381/352 |
| 2013/0270414 A1* | 10/2013 | McGovern, Jr. | F16F 7/14 |
| | | | 248/610 |
| 2018/0187822 A1* | 7/2018 | Yen | F16M 13/022 |
| 2019/0028788 A1* | 1/2019 | Ducker | H04R 1/083 |
| 2019/0045143 A1* | 2/2019 | Williams, IV | F16M 11/28 |
| 2020/0128962 A1* | 4/2020 | Acevedo | F16M 11/2021 |
| 2020/0275176 A1* | 8/2020 | Dodge, II | F16M 11/18 |

* cited by examiner

MULTI-DIMENSIONAL MICROPHONE STAND

RELATED APPLICATIONS

This application claims priority to Taiwan Application Serial Number 109138886, filed Nov. 6, 2020, the disclosures of which are incorporated herein by reference in their entireties.

TECHNICAL FIELD

The present disclosure generally relates to a microphone stand. More particularly, the present disclosure relates to a multi-dimensional microphone stand.

BACKGROUND

With the advancement of technology, the Internet has become more and more popular. The Internet has gradually changed the life and work of many people. The applications of the Internet have also brought some emerging industries, and many people have to face the computer screen all day long. Therefore, the communication mode between people has gradually changed quite differently from the past. With the popularity of the Internet, people have gradually become accustomed to more vivid and real online communication such as text, microphone or video communication.

In general, a microphone stand can utilize a cantilever arm to support a microphone and adjust the angle and height of the microphone. However, in the traditional microphone stand, most of the joint designs of the microphone stand have only one-dimensional adjustment mechanism, and the swing angle thereof is limited due to the mechanism limitation. In addition, some microphone stands utilize a four-bar linkage structure, and the volume thereof is quit huge, so that the user is inconvenient to adjust to a required position in a limited space of a table top, thus restricting the use of the microphone stand.

SUMMARY

One objective of the embodiments of the present invention is to provide a multi-dimensional microphone stand able to adjust the angle and height thereof in multiple dimensions according to a user's need, and save space during use and storage, and further conveniently install on a table top.

To achieve these and other advantages and in accordance with the objective of the embodiments of the present invention, as the embodiment broadly describes herein, the embodiments of the present invention provides a multi-dimensional microphone stand including a first rotational module, a first rotational arm, a second rotational module, a second rotational arm and a third rotational module. The first rotational arm is connected to, for example, rotatably connected to the first rotational module. The second rotational module is connected to, for example, rotatably connected to the first rotational arm. The first rotational module is rotatable relative to the second rotational module. The second rotational arm is connected to, for example, rotatably connected to the second rotational module. The third rotational module is connected to, for example, rotatably connected to the second rotational arm. The second rotational module is rotatable relative to the third rotational module, and the first rotational arm and the second rotational arm are arranged side by side and connected to the second rotational module in parallel in a folded state.

In one or more embodiments, the second rotational module includes a first rotational component and a second rotational component. The first rotational component is rotatable along a first rotation axis and the second rotational component is rotatable along a third rotation axis, and the first rotation axis is coaxial with the third rotation axis.

In one or more embodiments, the first rotational component includes a first connecting ring connected to the first rotational arm, the first rotational module is rotatable along a second rotation axis, and the first rotation axis is perpendicular to the second rotation axis. The second rotational component includes a second connecting ring connected to the second rotational arm, the third rotational module is rotatable along a fourth rotation axis, and the third rotation axis is perpendicular to the fourth rotation axis.

In one or more embodiments, the second rotational module further includes a rotational positioning device to tighten and position the first rotational component and the second rotational component.

In one or more embodiments, the first rotational module includes a first rotational component, a second rotational component and a rotational positioning device. The second rotational component is rotatable relative to the first rotational component of the first rotational module along a fifth rotation axis. In addition, the first rotational component of the first rotational module includes a first connecting ring rotatably connected to the first rotational arm. The rotational positioning device may tighten and position the first rotational component of the first rotational module and the second rotational component of the first rotational module.

In one or more embodiments, the multi-dimensional microphone stand includes a microphone connecting device fixing a microphone shockproof mount.

In one or more embodiments, the microphone connecting device includes a sleeve and a quick release screw. The sleeve is fixed to the second rotational component of the first rotational module and the quick release screw passes through the sleeve. The quick release screw includes a threaded connection component and an embossed knob exposed on two sides of the sleeve respectively.

In one or more embodiments, the microphone shockproof mount includes a ring-shaped shockproof holder, a filter fixing rod a filter and a rotational joint. The rotational joint is connected to the threaded connection component, the ring-shaped shockproof holder is connected to the rotational joint to fix a microphone, the filter fixing rod protrudes outward from the ring-shaped shockproof holder, and the filter is fixed on the filter fixing rod to cover the microphone.

In one or more embodiments, the third rotational module includes a first rotational component, a rotational base and a rotational positioning device. The first rotational component includes a first connecting ring is rotatably connected to the second rotational arm, the rotational base is rotatably connected to the first rotational component of the third rotational module and rotatably connected to a clamping device. In addition, the rotational positioning device may tighten and position the first rotational component of the third rotational module.

Hence, the multi-dimensional microphone stand disclosed in the present invention can effectively provide a plurality of rotational modules rotatably connected to a plurality of rotational arms respectively to offer a microphone stand with a scissor-like structure design. By way of the rotational structure, the multi-dimensional microphone stand may achieve a full extension state and a folded state to provide different extensional angles while using a microphone and a compact storage volume while folding the multi-dimensional microphone stand. In addition, by way of the rotational positioning device and the torque control, the multi-dimensional microphone stand may position the microphone at various angles and improve the in-use stability thereof. Therefore, the multi-dimensional microphone stand disclosed in the present invention may effectively improve the usability of the multi-dimensional microphone stand as well as reduce the folded volume of the multi-dimensional microphone stand.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present disclosure. This description is not to be taken in a limiting sense but is made merely for the purpose of describing the general principles of the invention. The scope of the invention should be determined by referencing the appended claims.

Figure 1:
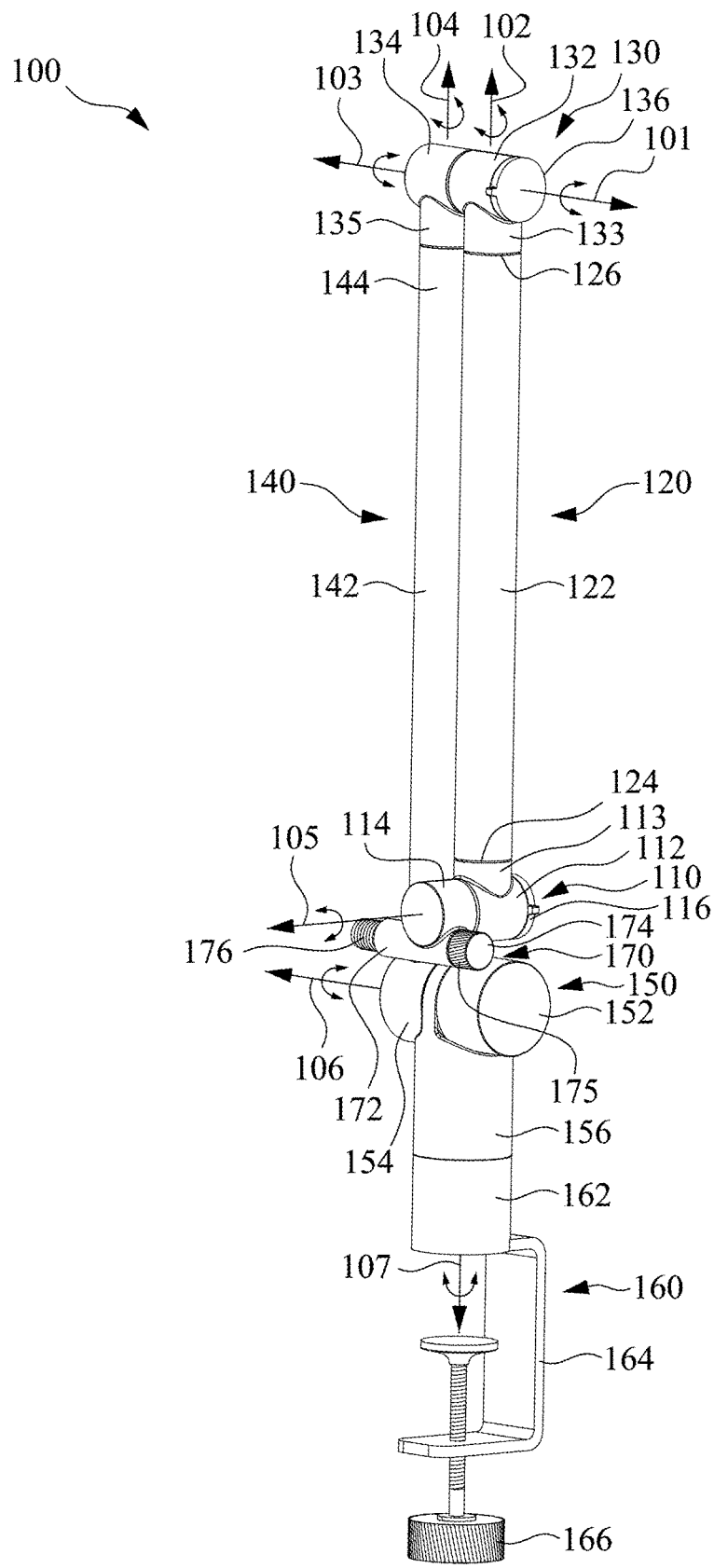
FIG. 1 illustrates a schematic perspective view showing a multi-dimensional microphone stand according to one embodiment of the present invention in a folded state.
Figure 2:
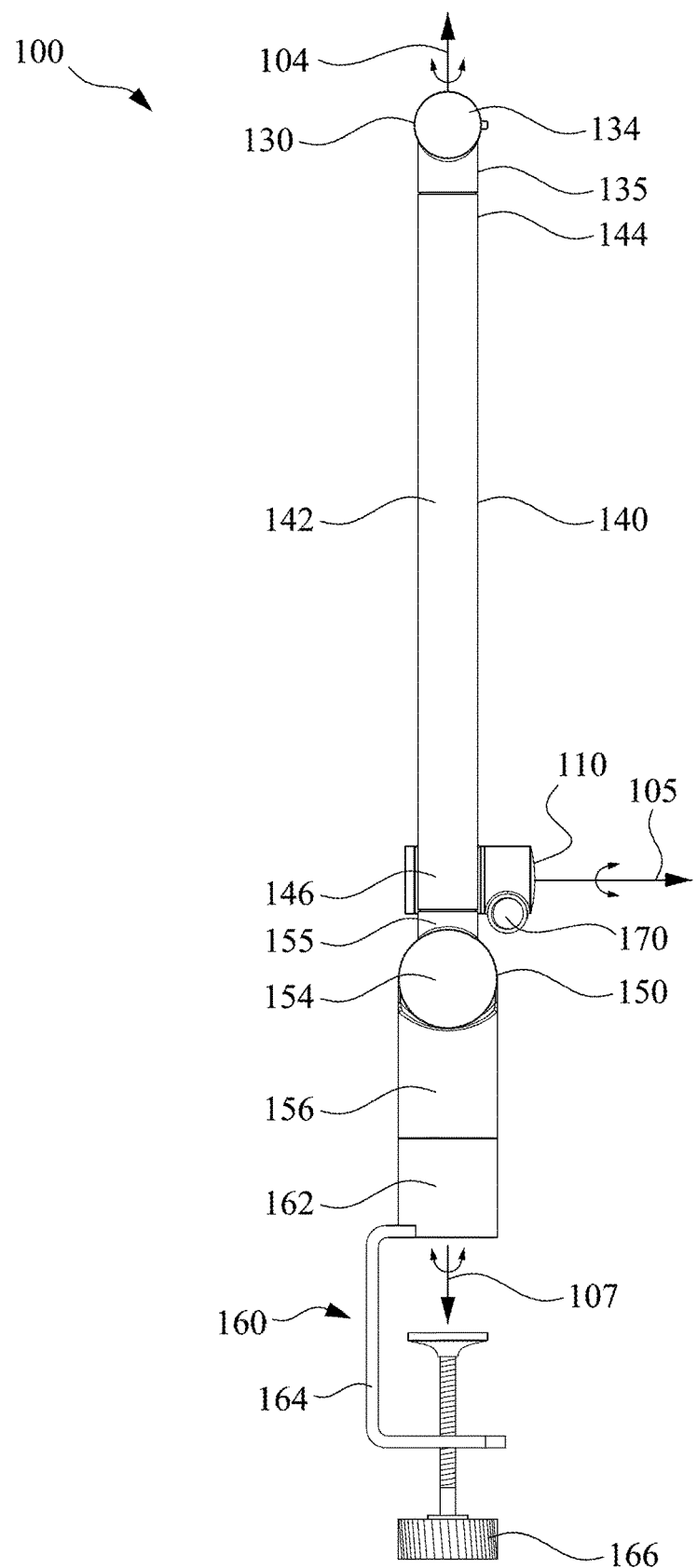
FIG. 2 illustrates a schematic side view showing the multi-dimensional microphone stand of FIG. 1.
Figure 3:
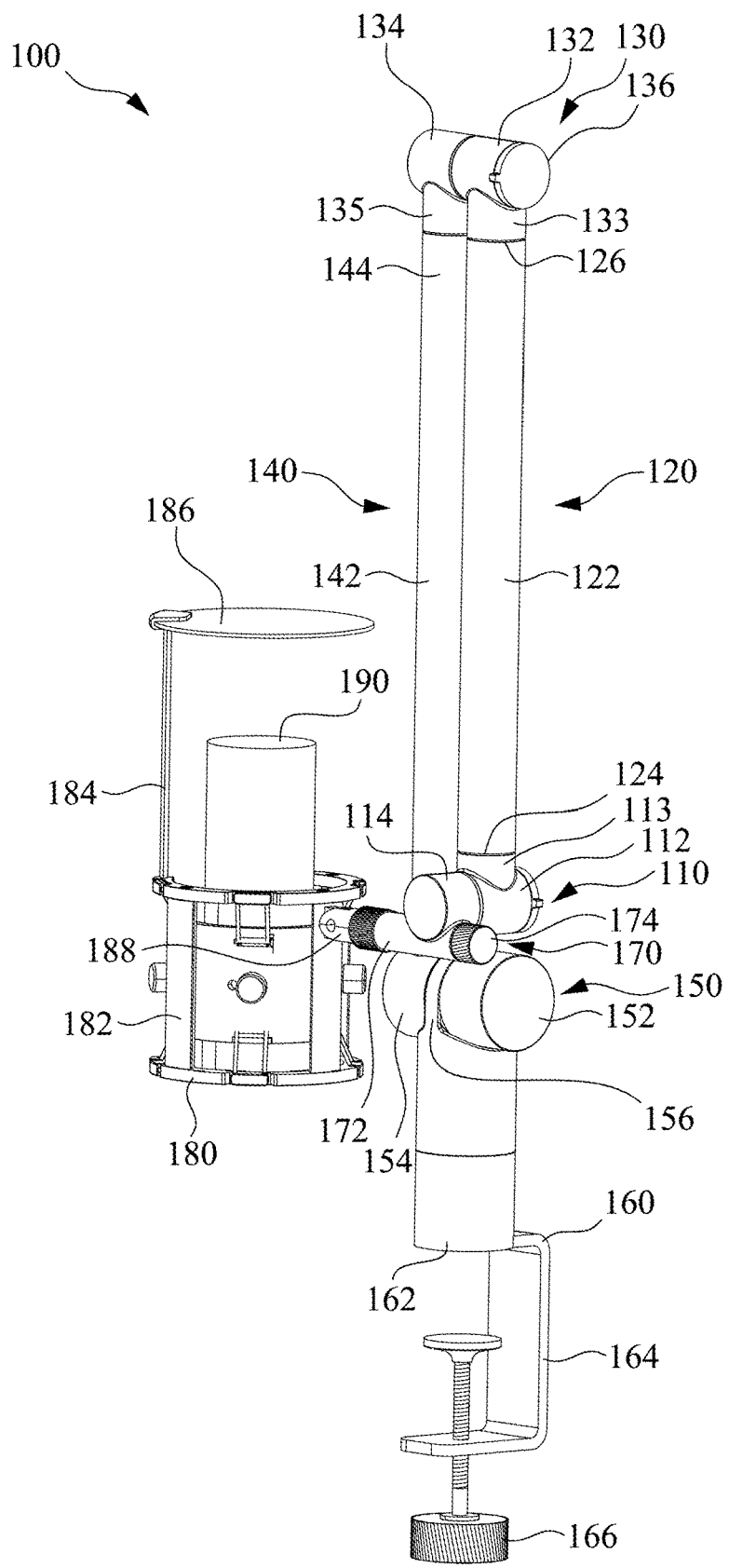
FIG. 3 illustrates a schematic perspective view showing a multi-dimensional microphone stand in a folded state according to one embodiment of the present invention equipped with a microphone.
Figure 4:
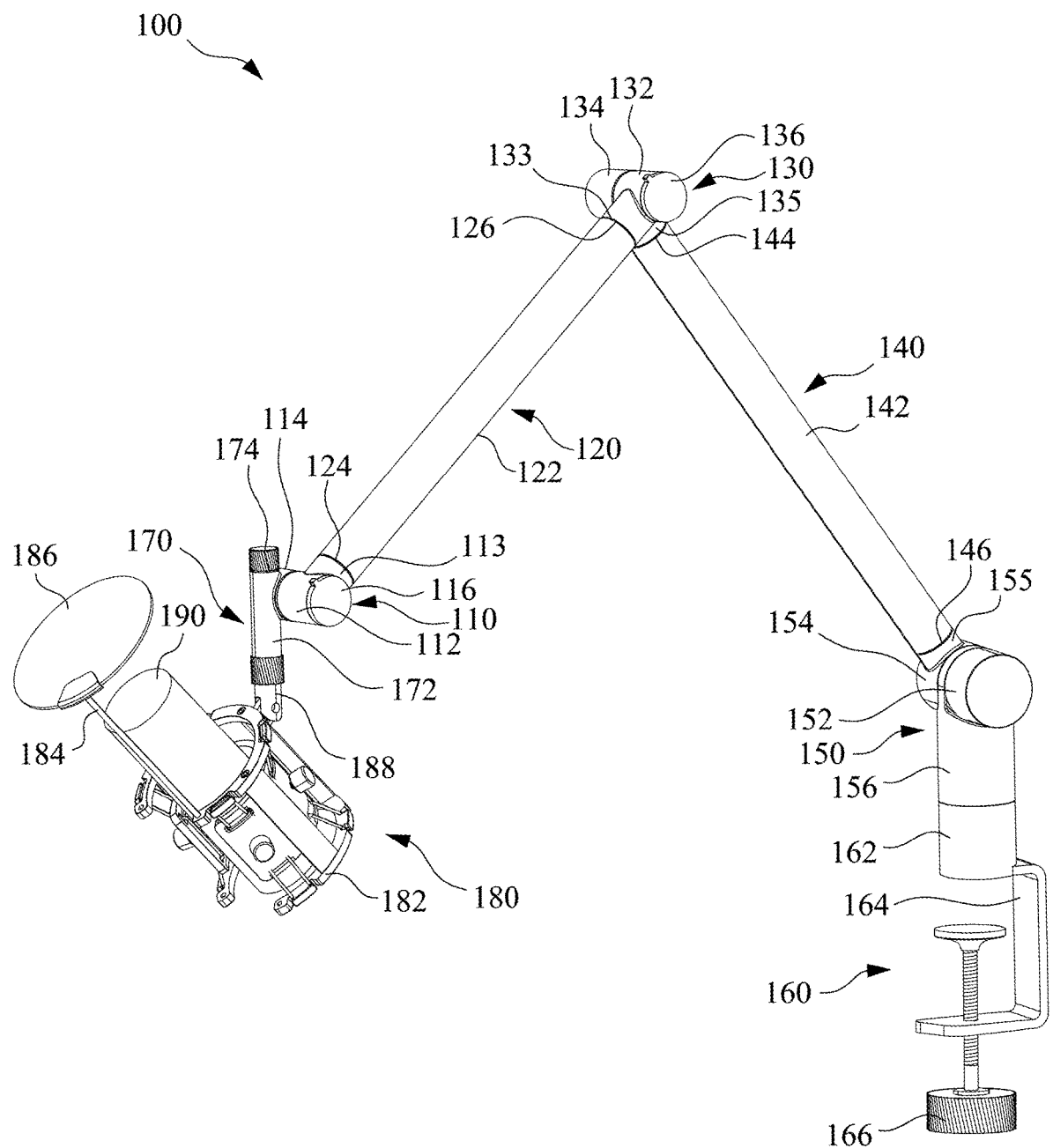
FIG. 4 illustrates a schematic perspective view showing the multi-dimensional microphone stand of FIG. 3 in an unfolded state.

FIG. 1 is a schematic perspective view showing a multi-dimensional microphone stand according to one embodiment of the present invention in a folded state, FIG. 2 is a schematic side view thereof, FIG. 3 is a schematic perspective view of the multi-dimensional microphone stand of FIG. 1 equipped with a microphone in a folded state, and FIG. 4 is a schematic perspective view thereof in an unfolded state.

Referring to FIGS. 1 and 2, the multi-dimensional microphone stand 100 includes a first rotational module 110, a first rotational arm 120, a second rotational module 130, a second rotational arm 140 and a third rotational module 150.

The first rotational arm 120 is connected to, for example, rotatably connected to the first rotational module 110, the second rotational module 130 is connected to, for example, rotatably connected to the first rotational arm 120, the second rotational arm 140 is connected to, for example, rotatably connected to the second rotational module 130, and the third rotational module 150 is connected to, for example, rotatably connected to the second rotational arm 140. As shown in FIGS. 1-3, in a folded state, the first rotational arm 120 and the second rotational arm 140 are arranged side by side in parallel, and are respectively connected to the second rotational module 130 to allow the multi-dimensional microphone stand 100 to have a compact storage volume in the folded state.

In one or more embodiments, the second rotational module 130 includes a first rotational component 132 and a second rotational component 134. The first rotational component 132 is rotatable along a first rotation axis 101, and the second rotational component 134 is rotatable along a third rotation axis 103. In one or more embodiments, the first rotation axis 101 is coaxial with the third rotation axis 103.

In one or more embodiments, the first rotational component 132 includes a first connecting ring 133 connected to, for example, rotatably connected to the first rotational arm 120 to allow the first rotational arm 120 to rotate along a second rotation axis 102. In addition, the first rotation axis 101 is perpendicular to the second rotation axis 102.

In one or more embodiments, the second rotational component 134 includes a second connecting ring 135 connected to, for example, rotatably connected to the second rotational arm 140 to allow the second rotational arm 140 to rotate along a fourth rotation axis 104. In addition, the third rotation axis 103 is perpendicular to the fourth rotation axis 104.

In one or more embodiments, the second rotational module 130 further includes a rotational positioning device 136 to tighten and position the first rotational component 132 and the second rotational component 134.

In one or more embodiments, the first rotational module 110 includes a first rotational component 112, a second rotational component 114 and a rotational positioning device 116. The second rotational component 114 is rotatably relative to the first rotational component 112 of the first rotational module 110 along a fifth rotation axis 105. In addition, the first rotational component 112 of the first rotational module 110 includes a first connecting ring 113 connected to, for example, rotatably connected to the first rotational arm 120. The rotational positioning device 116 can tighten and position the first rotational component 112 of the first rotational module 110 and the second rotational component 114 of the first rotational module 110.

In one or more embodiments, the first rotational arm 120 includes a rotational arm main body 122, and a first end 124 of the rotational arm main body 122 is rotatably connected to the first connecting ring 113 of the first rotational component 112 of the first rotational module 110, and a second end 126 of the rotational arm main body 122 is rotatably connected to the first connecting ring 133 of the first rotational component 132 of the second rotational module 130 to allow the first rotational arm 120 rotatable along a second rotation axis 102. However, the present invention is not limited to this, the rotational arm main body 122 can be only rotatably connected to the first connecting ring 113 of the first rotational component 112 of the first rotational module 110 or only rotatably connected to the first connecting ring 133 of the first rotational component 132 of the second rotational module 130 to allow the first rotational module 110 rotatable relative to the second rotational module 130 along the second rotation axis 102, without departing from the spirit and scope of the present invention.

In one or more embodiments, the third rotational module 150 includes a first rotational component 154, a rotational base 156 and a rotational positioning device 152. The first rotational component 154 includes a first connecting ring 155 connected to, for example, rotatably connected to the second rotational arm 140, the rotational base 156 is rotatably connected to the first rotational component 154 of the third rotational module 150 along the sixth rotation axis 106, and at the same time is rotatably connected to a clamping device 160. The clamping device 160 is utilized to fix on a plate, such as a table top. In addition, the rotational positioning device 152 is utilized to tighten and position the first rotational component 154 of the third rotational module 150 on the rotational base 156.

In one or more embodiments, the second rotational arm 140 includes a rotational arm main body 142, a first end 144 of the rotational arm main body 142 is rotatably connected to the second connecting ring 135 of the second rotational component 134 of the second rotational module 130, and a second end 146 of the rotational arm main body 142 is rotatably connected to the first connecting ring 155 of the first rotational component 154 of the third rotational module 150 to allow the second rotational arm 140 rotatable along a fourth rotation axis 104. However, the present invention is not limited to this, the rotational arm main body 142 can be only rotatably connected to the second connecting ring 135 of the second rotational component 134 of the second rotational module 130, or only rotatably connected to the first connecting ring 155 of the first rotational component 154 of the third rotational module 150 to allow the third rotational module 150 rotatable relative to the second rotational module 130 along the fourth rotation axis 104, without departing from the spirit and scope of the present invention.

In one or more embodiments, the clamping device 160 includes a connecting seat 162, a U-shaped frame 164 and a fixing bolt 166. The connecting seat 162 is rotatably connected to the rotational base 156 along the seventh rotation axis 107, the U-shaped frame 164 is connected to the connecting seat 162, and the fixing bolt 166 passes through the U-shaped frame 164 and is moved top and down through threads to effectively fix the clamping device 160 on the table top.

In one or more embodiments, the multi-dimensional microphone stand 100 further includes a microphone connecting device 170 to fix a microphone shockproof mount 180. The microphone connecting device 170 includes a sleeve 172 and a quick release screw 174. The sleeve 172 is fixed to the second rotational component 114 of the first rotational module 110, the quick release screw 174 passes through the sleeve 172, and the quick release screw 174 includes a threaded connection component 176 and an embossed knob 175 respectively exposed on two sides of the sleeve 172. A user may rotate the embossed knob 175 to rotate the threaded connection component 176 to conveniently couple to a corresponding thread of the microphone shockproof mount 180 during use.

Further referring to FIGS. 3 and 4, the microphone shockproof mount 180 includes a ring-shaped shockproof holder 182, a filter fixing rod 184, a filter 186 and a rotational joint 188. The rotational joint 188 is connected to the threaded connection component 176, the ring-shaped shockproof holder 182 for fixing a microphone 190 is connected to the rotational joint 188, and the filter fixing rod 184 is extended outward from the ring-shaped shockproof holder 182 along a direction of the microphone 190 and beyond the microphone 190. In addition, the filter 186 is clipped and fixed on the filter fixing rod 184 to cover and protect the microphone 190 so as to reduce the probability of breath noise directly received by the microphone, thereby avoiding microphone noise, improving the voice quality, and further avoiding saliva spraying on the microphone during use.

In one or more embodiments, the microphone shockproof mount 180 is rotatable relative to the microphone connecting device 170 about 360 degrees.

In one or more embodiments, the first rotational component 112 of the first rotational module 110 is rotatable from −180 degrees to 180 degrees relative to the second rotational component 114 of the first rotational module 110.

In one or more embodiments, the first connecting ring 113 of the first rotational component 112 of the first rotational module 110 is rotatable from −90 degrees to 90 degrees relative to the first rotational arm 120.

In one or more embodiments, the first connecting ring 133 of the first rotational component 132 of the second rotational module 130 is rotatable from −90 degrees to 90 degrees relative to the first rotational arm 120.

In one or more embodiments, the second rotational component 134 of the second rotational module 130 is rotatable from −180 degrees to 180 degrees relative to the first rotational component 132 of the second rotational module 130.

In one or more embodiments, the second connecting ring 135 of the second rotational component 134 of the second rotational module 130 is rotatable from −90 degrees to 90 degrees relative to the second rotational arm 140.

In one or more embodiments, the first connecting ring 155 of the first rotational component 154 of the third rotational module 150 is rotatable from −90 degrees to 90 degrees relative to the second rotational arm 140.

In one or more embodiments, the first rotational component 154 of the third rotational module 150 is rotatable from −90 degrees to 90 degrees relative to the rotational base 156 of the third rotational module 150.

In one or more embodiments, the rotational base 156 of the third rotational module 150 is rotatable about 360 degrees relative to the connecting seat 162 of the clamping device 160.

Accordingly, the multi-dimensional microphone stand disclosed in the present invention can effectively provide a plurality of rotational modules rotatably connected to a plurality of rotational arms respectively to offer a microphone stand with a scissor-like structure design. By way of the rotational structure, the multi-dimensional microphone stand may achieve a full extension state and a folded state to provide different extensional angles while using a microphone and a compact storage volume while folding the multi-dimensional microphone stand. In addition, by way of the rotational positioning device and the torque control, the multi-dimensional microphone stand may position the microphone at various angles and improve the in-use stability thereof. Therefore, the multi-dimensional microphone stand disclosed in the present invention may effectively improve the usability of the multi-dimensional microphone stand as well as reduce the folded volume of the multi-dimensional microphone stand.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:
1. A multi-dimensional microphone stand, comprising:
a first rotational module comprising a first rotational component and a second rotational component;
a first rotational arm connected to the first rotational module;
a second rotational module connected to the first rotational arm, wherein the first rotational module rotatable relative to the second rotational module;
a second rotational arm connected to the second rotational module;

a third rotational module connected to the second rotational arm, wherein the second rotational module is rotatable relative to the third rotational module, and the first rotational arm and the second rotational arm arranged side by side and connected to the second rotational module in parallel in a folded state; and a microphone connecting device, comprising:

a sleeve fixed to the second rotational component of the first rotational module; and a quick release screw passing through the sleeve, wherein the quick release screw comprises a threaded connection component and an embossed knob exposed on two sides of the sleeve respectively.

2. The multi-dimensional microphone stand of claim 1, wherein the second rotational module comprises:

a first rotational component rotatable along a first rotation axis; and a second rotational component rotatable along a third rotation axis, wherein the first rotation axis is coaxial with the third rotation axis.

3. The multi-dimensional microphone stand of claim 2, wherein the first rotational component of the second rotational module comprises a first connecting ring connected to the first rotational arm, and the first rotational module is rotatable along a second rotation axis, wherein the first rotation axis is perpendicular to the second rotation axis.

4. The multi-dimensional microphone stand of claim 3, wherein the second rotational component of the second rotational module comprises a second connecting ring connected to the second rotational arm, and the third rotational module is rotatable along a fourth rotation axis, wherein the third rotation axis is perpendicular to the fourth rotation axis.

5. The multi-dimensional microphone stand of claim 4, wherein the second rotational module further comprises a rotational positioning device to tighten and position the first rotational component of the second rotational module and the second rotational component of the second rotational module.

6. The multi-dimensional microphone stand of claim 5, wherein the first rotational module further comprises:

a rotational positioning device, wherein the second rotational component of the first rotational module is rotatable relative to the first rotational component of the first rotational module along a fifth rotation axis, wherein the first rotational component of the first rotational module comprises a first connecting ring rotatably connected to the first rotational arm, and the rotational positioning device tightens and positions the first rotational component of the first rotational module and the second rotational component of the first rotational module.

7. The multi-dimensional microphone stand of claim 1, further comprising a microphone shockproof mount fixed on the microphone connecting device, wherein the microphone shockproof mount comprises:

a rotational joint connected to the threaded connection component;

a ring-shaped shockproof holder connected to the rotational joint to fix a microphone;

a filter fixing rod protruding outward from the ring-shaped shockproof holder; and a filter fixed on the filter fixing rod to cover the microphone.

8. The multi-dimensional microphone stand of claim 7, wherein the third rotational module comprises:

a first rotational component comprising a first connecting ring rotatably connected to the second rotational arm;

a rotational base rotatably connected to the first rotational component of the third rotational module and rotatably connected to a clamping device; and a rotational positioning device tightening and positioning the first rotational component of the third rotational module.

9. The multi-dimensional microphone stand of claim 2, wherein the second rotational component of the first rotational module is rotatable relative to the first rotational component of the first rotational module along a fifth rotation axis, wherein the first rotational component of the first rotational module comprises a first connecting ring rotatably connected to the first rotational arm.

* * * * *